US008438276B1

(12) United States Patent
Haber et al.

(10) Patent No.: US 8,438,276 B1
(45) Date of Patent: *May 7, 2013

(54) METHOD OF MONITORING NETWORK AND APPLICATION PERFORMANCE BY ANALYZING WEB CLIENTS AND WEB SERVERS

(75) Inventors: Lior Haber, Modiin (IL); Samuel Bercovici, Tel-Aviv (IL)

(73) Assignee: Precise Software Solutions, Inc., Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/958,740

(22) Filed: Dec. 2, 2010

Related U.S. Application Data

(63) Continuation of application No. 10/930,481, filed on Aug. 31, 2004, now Pat. No. 7,849,183.

(51) Int. Cl.
    *G06F 15/173* (2006.01)
    *G06F 3/00* (2006.01)
(52) U.S. Cl.
    USPC .......................................... 709/224; 719/318
(58) Field of Classification Search .................. 709/223, 709/224; 719/318
    See application file for complete search history.

(56) References Cited

U.S. PATENT DOCUMENTS

| 5,450,586 A | 9/1995 | Kuzara et al. |
| 5,471,629 A | 11/1995 | Risch |
| 5,732,218 A | 3/1998 | Bland et al. |
| 5,758,156 A * | 5/1998 | Kano ............................ 713/100 |
| 5,881,379 A | 3/1999 | Beier et al. |
| 5,987,480 A | 11/1999 | Donohue et al. |
| 5,996,010 A | 11/1999 | Leong et al. |
| 6,049,827 A | 4/2000 | Sugauchi et al. |
| 6,065,013 A | 5/2000 | Fuh et al. |
| 6,070,190 A | 5/2000 | Reps et al. |
| 6,081,518 A | 6/2000 | Bowman-Amuah |

(Continued)

FOREIGN PATENT DOCUMENTS

WO    WO 2005/008529    1/2005

OTHER PUBLICATIONS

Mercury Interactive Delivers Web Performance Testing and Monitoring Solutions for Streaming Media, press release, Dec. 12, 2000, 3 pages.

(Continued)

*Primary Examiner* — Jeong S Park
(74) *Attorney, Agent, or Firm* — Dorsey & Whitney LLP

(57) ABSTRACT

A system and method for monitoring network and application performance. In one embodiment the method comprises logging information on network interface card (NIC) events involving a web page transaction, logging information on web server events involving the web page transaction, logging information on client browser events involving the web page transaction, collecting the information on NIC events, the information on web server events, and the information on client browser events on a collector server, and correlating the information on NIC events, the information on web server events, and the information on client browser events. In a further embodiment, correlating the information may comprise correlating the information on NIC events with the information on web server events by grouping the events by a client address and by a server address and then matching pairs of NIC events and web server events by time and data transfer size. Correlating the information may also comprise correlating the information on client browser events with the information on web server events by a color ID.

15 Claims, 7 Drawing Sheets

U.S. PATENT DOCUMENTS

| | | | |
|---|---|---|---|
| 6,094,680 A | 7/2000 | Hokanson | |
| 6,144,970 A | 11/2000 | Bonner et al. | |
| 6,148,335 A | 11/2000 | Haggard et al. | |
| 6,167,448 A | 12/2000 | Hemphill et al. | |
| 6,192,377 B1 | 2/2001 | Ganesh et al. | |
| 6,195,097 B1 | 2/2001 | Shrader et al. | |
| 6,317,786 B1 | 11/2001 | Yamane et al. | |
| 6,317,788 B1 | 11/2001 | Richardson | |
| 6,321,263 B1 | 11/2001 | Luzzi et al. | |
| 6,351,742 B1 | 2/2002 | Agarwal et al. | |
| 6,356,889 B1 | 3/2002 | Lohman et al. | |
| 6,389,430 B1 | 5/2002 | Parker | |
| 6,400,681 B1 | 6/2002 | Bertin et al. | |
| 6,553,369 B1 | 4/2003 | Soule et al. | |
| 6,571,233 B2 | 5/2003 | Beavin et al. | |
| 6,615,212 B1 | 9/2003 | Dutta et al. | |
| 6,697,849 B1 | 2/2004 | Carlson | |
| 6,701,363 B1 | 3/2004 | Chiu et al. | |
| 6,732,167 B1 | 5/2004 | Swartz et al. | |
| 6,757,670 B1 | 6/2004 | Inohara et al. | |
| 6,760,903 B1 | 7/2004 | Morshed et al. | |
| 6,772,411 B2 | 8/2004 | Hayes et al. | |
| 6,792,459 B2 | 9/2004 | Elnozahy et al. | |
| 6,792,460 B2 | 9/2004 | Oulu et al. | |
| 6,813,248 B1 | 11/2004 | Boss et al. | |
| 6,823,382 B2 | 11/2004 | Stone | |
| 6,826,606 B2 | 11/2004 | Freeman et al. | |
| 6,850,252 B1 | 2/2005 | Hoffberg | |
| 6,857,119 B1 | 2/2005 | Desai | |
| 6,917,971 B1 | 7/2005 | Klein | |
| 6,928,472 B1 | 8/2005 | Wen | |
| 6,944,630 B2 | 9/2005 | Vos et al. | |
| 6,970,924 B1 | 11/2005 | Chu et al. | |
| 6,973,490 B1 | 12/2005 | Robertson et al. | |
| 7,107,273 B2 | 9/2006 | Ohata et al. | |
| 7,130,807 B1 | 10/2006 | Mikurak | |
| 7,143,159 B1 * | 11/2006 | Grace et al. | 709/224 |
| 7,146,352 B2 | 12/2006 | Brundage et al. | |
| 7,293,133 B1 | 11/2007 | Colgrove et al. | |
| 7,382,371 B1 | 6/2008 | Ciabarra | |
| 7,546,576 B2 | 6/2009 | Egli | |
| 7,606,792 B2 | 10/2009 | Cunningham et al. | |
| 7,849,183 B1 * | 12/2010 | Haber et al. | 709/224 |
| 2002/0055964 A1 | 5/2002 | Luk et al. | |
| 2002/0083183 A1 | 6/2002 | Pujare et al. | |
| 2002/0091746 A1 | 7/2002 | Umberger et al. | |
| 2002/0099818 A1 * | 7/2002 | Russell et al. | 709/224 |
| 2002/0188592 A1 | 12/2002 | Leonhardt et al. | |
| 2003/0007008 A1 * | 1/2003 | McBrearty et al. | 345/786 |
| 2003/0055913 A1 | 3/2003 | Harkin et al. | |
| 2003/0056200 A1 | 3/2003 | Li et al. | |
| 2003/0182276 A1 | 9/2003 | Bossman et al. | |
| 2003/0220936 A1 | 11/2003 | Gifford | |
| 2003/0233445 A1 * | 12/2003 | Levy et al. | 709/224 |
| 2003/0236877 A1 | 12/2003 | Allan | |
| 2004/0030782 A1 | 2/2004 | Nakahara | |
| 2004/0103079 A1 | 5/2004 | Tokusho et al. | |
| 2004/0133591 A1 | 7/2004 | Holenstein et al. | |
| 2004/0172636 A1 | 9/2004 | Do et al. | |
| 2004/0205718 A1 | 10/2004 | Reynders | |
| 2004/0215768 A1 | 10/2004 | Oulu et al. | |
| 2005/0004892 A1 | 1/2005 | Brundage et al. | |
| 2005/0039171 A1 | 2/2005 | Avakian et al. | |
| 2005/0050046 A1 | 3/2005 | Puz et al. | |
| 2005/0076154 A1 | 4/2005 | Chambliss et al. | |
| 2005/0086242 A1 | 4/2005 | Ngai et al. | |
| 2005/0091035 A1 | 4/2005 | Kaplan et al. | |
| 2005/0091468 A1 | 4/2005 | Morita et al. | |
| 2005/0132335 A1 | 6/2005 | Maron | |
| 2005/0254422 A1 | 11/2005 | Harkin et al. | |
| 2006/0010169 A1 | 1/2006 | Kitamura | |
| 2006/0115512 A1 | 6/2006 | Peacock et al. | |
| 2007/0016556 A1 | 1/2007 | Ann et al. | |
| 2007/0271562 A1 | 11/2007 | Schumacher et al. | |
| 2007/0288444 A1 | 12/2007 | Nelken et al. | |
| 2008/0005317 A1 | 1/2008 | Diao et al. | |
| 2008/0134181 A1 | 6/2008 | Herbeck et al. | |
| 2008/0229300 A1 | 9/2008 | O'Brien | |

OTHER PUBLICATIONS

Akamai. "Turbo-Charging Dynamic Web Sites with Akamai EdgeSuite." Akamai White Paper, 2001, pp. 1-16.

William G. J. Halfond et al., "Combining static analysis and runtime monitoring to counter SQL injection attacks", ACM, May 2005, pp. 1-7.

Mark Strembeck et al., "An integrated approach to engineer and enforce context constraints in RBAC environments", ACM.\, Aug. 2004, pp. 392-427.

Thomas A. Mueck et al., "A configurable type hierarchy index for OODB", ACM, Mar. 1997, pp. 312-332.

Daniela Floreseu et al., The BEA/XQRL streaming Xquery processor, Google Scholar, 29.sup.th VLDB conference 2003, Berlin, Germany, pp. 1-12.

Precise/Indepth for the J2EE Platform User's Guide Version 6.2 Precise 2003 Precise Software Solutions Ltd. All Rights Reserved pp. 1-205.

Stern. "Beyond Client/Server." Advanced Systems, Apr. 1995, all pages, Sunworld.

Symantec. Symantec i3tm for Microsoft.NET. Data Sheet: Application Performance Management, 2006, pp. 1-4, Symantec Corporation.

Veritas. "Veritas Insight 7.1 User's Guide." Aug. 2004, pp. 1-170, Veritas Software Corporation.

Veritas. "Veritas Indepth for Microsoft.NET 7.1." User's Guide, 2005, pp. 1-102, Veritas Software Corporation.

* cited by examiner

METHOD OF MONITORING NETWORK AND APPLICATION PERFORMANCE BY ANALYZING WEB CLIENTS AND WEB SERVERS

CROSS-REFERENCE TO RELATED APPLICATION

This application is a continuation of U.S. patent application Ser. No. 10/930,481, filed Aug. 31, 2004, in the name of the same inventors, under the same title, now allowed, and hereby incorporated by reference as if fully set forth herein.

BACKGROUND OF THE INVENTION

1. Field of the Invention

This invention relates to the field of computer processing and, more particularly, to the monitoring of web page transfers between web clients and servers.

2. Description of the Related Art

In the information technology (IT) departments of modem organizations, one of to the biggest challenges is meeting the increasingly demanding service levels required by users. With more and more applications directly accessible to customers via automated interfaces such as the world wide web, "normal" business hours for many enterprises are now 24 hours a day, 7 days a week. As a result, the importance of monitoring and maintaining the quality of web applications and web services has increased dramatically.

Web applications and web services may be monitored on both the server side and the client side. Monitoring the server side may comprise monitoring the performance of a single node web server, or monitoring the performance of dozens or hundreds of nodes organized into multiple tiers of web servers, application servers and databases. Monitoring a multi-tier server installation may comprise monitoring communications within a given tier and communications between tiers. The monitored performance of the server side may further be correlated to distinct web page requests, client network addresses, and the historical performance of the server side.

Client side monitoring may comprise monitoring the performance of a web browser in rendering and displaying a web page. However, client side monitoring often occurs independently of server side monitoring, with no correlation between the performance data. Furthermore, even when client side monitoring occurs, only a select subset of clients may be monitored, and only in certain artificial scenarios which may not be indicative of real-world usage. Accordingly, such client side monitoring may be of limited applicability in presenting a complete picture of all transactions between the client and server.

SUMMARY OF THE INVENTION

Various embodiments of a system and method for monitoring network and application performance are disclosed. In one embodiment the method comprises logging information on network interface card (NIC) events involving a web page transaction; logging information on web server events involving the web page transaction; logging information on client browser events involving the web page transaction; collecting the information on NIC events, the information on web server events, and the information on client browser events on a collector server; and correlating the information on NIC events, the information on web server events, and the information on client browser events to monitor performance of the web page transaction.

In a further embodiment, correlating the information may comprise correlating the information on NEC events with the information on web server events by grouping the events by a client address and by a server address and then matching pairs of NIC events and web server events by time and data transfer size.

In one embodiment, logging information on NEC events comprises utilizing a NIC agent, logging information on web server events comprises utilizing a web server agent, and logging information on client browser events comprises utilizing a browser agent. The browser agent may be operable to log a time at which a request for a web page was sent, a time at which a response including the web page was received, a time at which the web page completed rendering, and a color ID associated with the web page. In an additional embodiment the browser agent may further be operable to log whether the web page was abandoned before the web page completed rendering.

In another embodiment, the method may further comprise displaying correlated information to an end user. In various embodiments displaying the correlated information may comprise displaying information on the overall operation of one or more web servers, and displaying information on the web page transaction.

Figure 1:
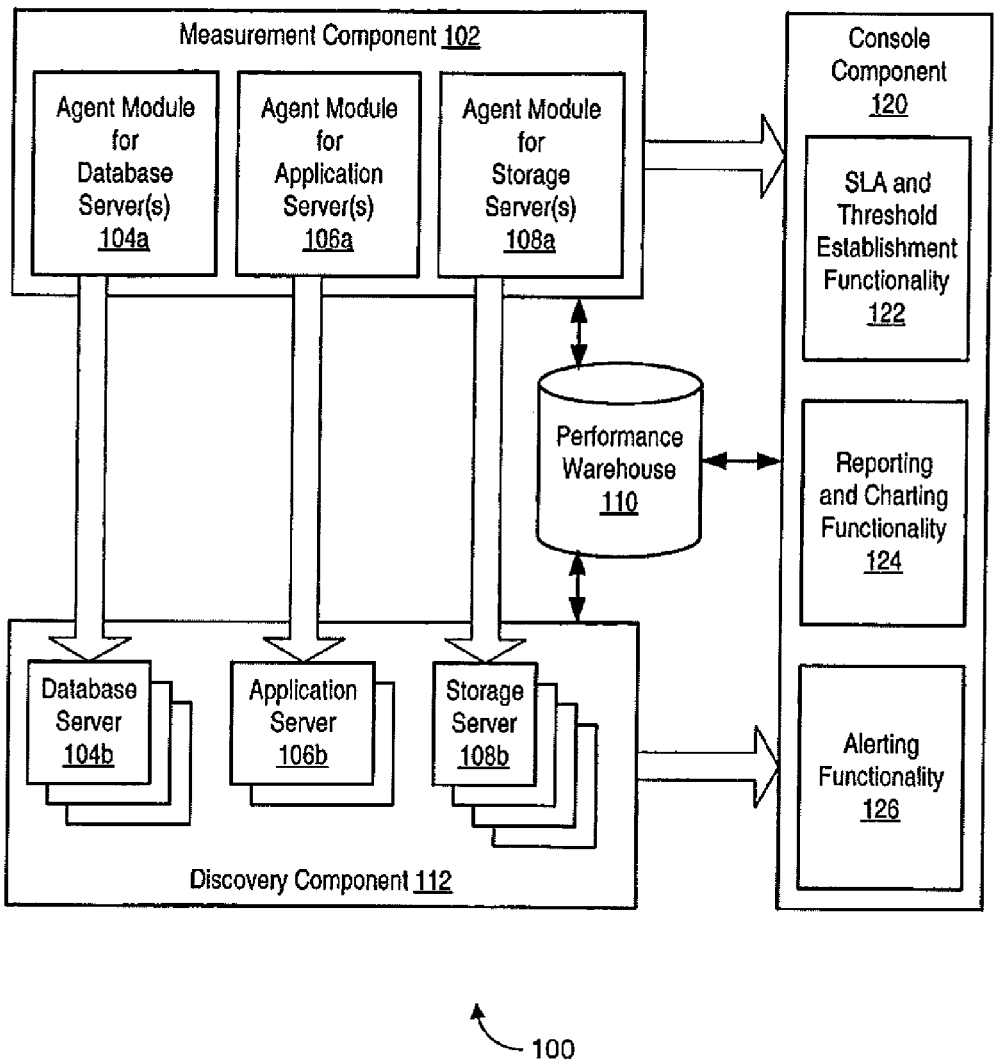
FIG. 1 is a block diagram of one embodiment of a performance management system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

A performance management system may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAP®; various products from Siebel Systems, Inc.; ClarifyCRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs. The performance management system may further include a system for collecting and analyzing performance data from client systems, and for correlating said data with performance data collected from the target systems described above.

Figure 2:
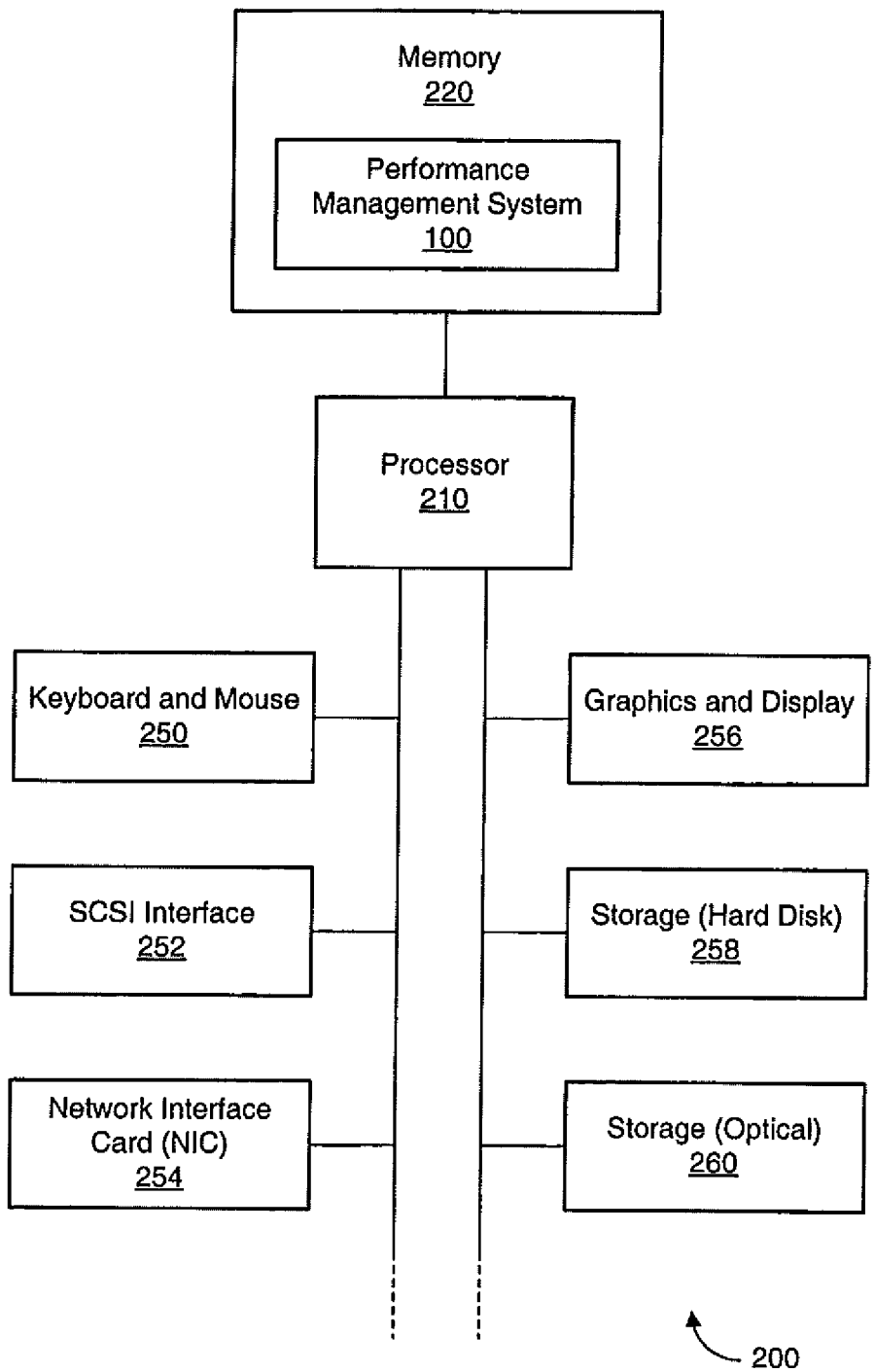
FIG. 2 is a block diagram of one embodiment of a computer system.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system is illustrated in FIG. 2.

In one embodiment, the measurement component 102 uses agent software to capture performance metrics on servers running target applications. Specifically, measurement component 102 may capture data from various web servers, application servers, and database servers, components within a server such as a network software module or a network interface card, and end user applications such as client browsers. The measurement component 102 may thus provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may also measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104b, 106b, and 108b is provided for purposes of illustration and example and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 includes a repository of performance metrics which are accessible to the other components in the performance management system 100. For example, the historical data in the performance warehouse 110 may be used by the other components to provide short- and long-term analysis in varying degrees of detail.

The performance management system 100 of FIG. 1 may be executed by one or more networked computer systems. FIG. 2 is an exemplary block diagram of such a computer system 200. The computer system 200 includes a processor 210 and a memory 220 coupled together by communications bus 205. The processor 210 can be a single processor or a number of individual processors working together. The memory 220 is typically random access memory (RAM), or some other dynamic storage device, and is capable of storing instructions to be executed by the processor 210. The memory 220 may store temporary variables or other intermediate information during the execution of instructions by the processor 210. The memory 220 may store operating system (OS) software to be executed by the processor 210.

In various configurations, the computer system 200 may include devices and components such as a keyboard & mouse 250, a SCSI interface 252, a network interface card 254, a graphics & display device 256, a hard disk 258, and/or a CD-ROM 260, all of which are coupled to the processor 210 by a communications bus 207. The network interface card (NIC) 254 may provide a communications link to one or more other computer systems via a LAN (local area network), WAN (wide area network), internet, intranet, or other appropriate networks. It will be apparent to those having ordinary skill in the art that the computer system 200 can also include numerous elements not shown in the figure, such as additional storage devices, communications devices, input devices, and output devices, as illustrated by the ellipsis.

Figure 3:
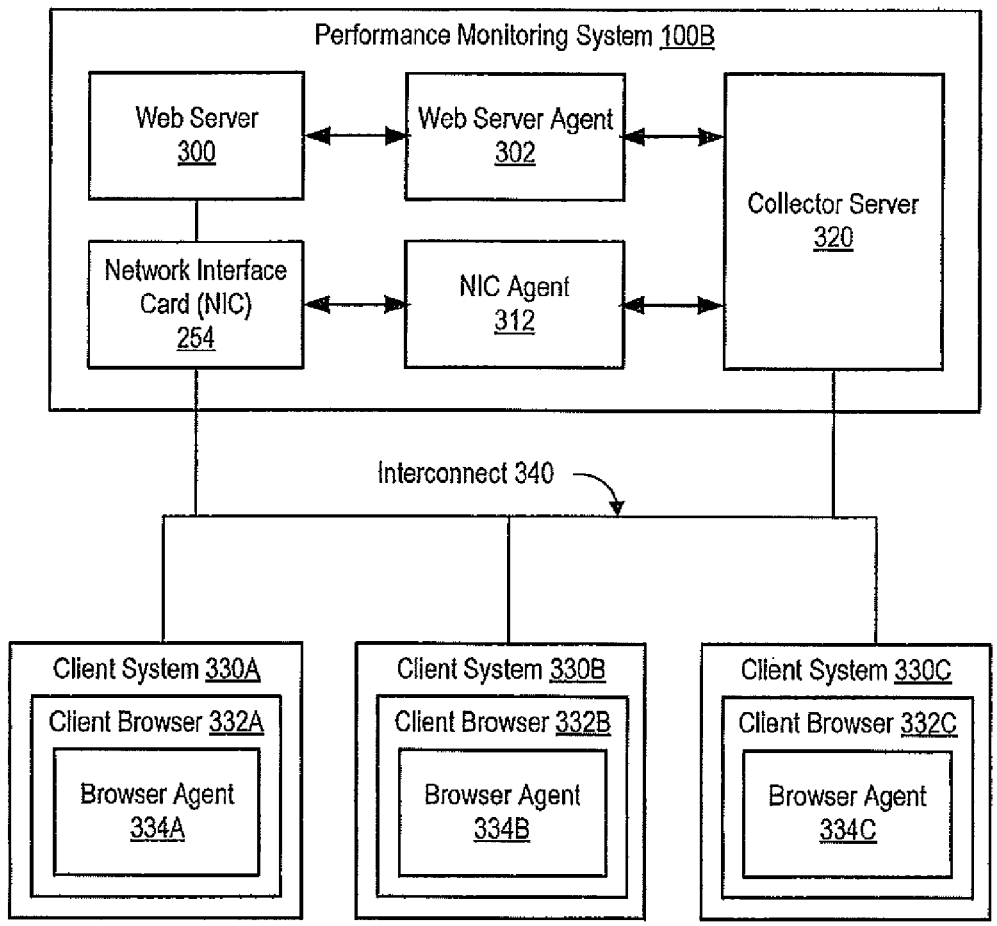
FIG. 3 is a block diagram of another embodiment of a performance monitoring system.

Turning now to FIG. 3, a diagram of another embodiment of a performance monitoring system is shown. As described above, performance monitoring system 100 may monitor key components and/or applications of computer systems, such as a NIC 254 and a web server 300. Web sewer 300 is operable to distribute a response to a request from one or more client systems 320A-C. A response may be a web page, image file, applet, media file, or other component of a web page, as will be described in further detail below. Furthermore, web server 300 may be operable to "color" each web page returned with a given color ID, which may in turn be used to correlate data from different sources, as will also be described in further detail below.

Web server 300 may further be operable to operate in tandem with a web server agent 302. Web server agent 302 may be operable to log information on responses sent from web server 300, including, but not limited to, the data transfer size of a response, the time a response was sent, the color ID associated with a response, and the network address a response was sent to. In one embodiment, web server 300 may be a computer system 200 of the type described above, with web server agent 302 executing as a separate program on web server 300. Alternatively, in another embodiment web server 300 may be a software application executing on a single computer system 200, or a cluster of computer systems 200, with web server agent 302 executing as a software program or filter (e.g., an ISAPI filter) in parallel with web server 300.

NIC 254 may also be monitored by a NIC agent 312, which is operable to monitor the responses sent by web server 300 through NIC 254. Specifically, in one embodiment NIC agent 312 may be operable to log information on each request and response which passes through NEC 254, including, but not limited to, the size of a request or response, the time a request or response was received or sent, and the network address a request or response was received from or sent to. In one embodiment NEC agent 312 may be a software program operable to log information on all requests or responses which pass between a tier of web servers 300 and a tier of network interface cards 254. Alternatively, in another embodiment NIC agent 312 may be a software or firmware program operable only to log information on individual data packets sent to or from a specific NIC 254.

Client systems 320A-C may also be computer systems 200 of the type described in FIG. 2, and may be connected to performance monitoring system 100 by interconnect 340. Interconnect 340 may be a local area network (LAN), a wide area network (WAN), the Internet, or any combination thereof. Each client system 320A-C may further comprise a client browser 330A-C (referred to generally as client browsers 330). Client browsers 330 may each be operable to send one or more requests for web pages, image files, applets, media files, or other components to web server 300, and to receive and render one or more corresponding responses from web server 300.

Each client browser 330 may further include one or more browser agents 332A-C (referred to generally as browser agents 332). Browser agents 332 may be lightweight programs executing on client browsers 330, and, in various embodiments, may be written in any of a number of different lightweight cross-platform scripting languages, including Java™ or Javascript™. In one embodiment each browser agent 332 may be operable to log information including, but not limited to, the time an associated client browser 330 requests a specific web page, the time the time browser 330 begins to receive the web page, if an end user abandons the web page before the web page completes rendering, at what time the browser 330 finishes rendering the web page, and the color ID associated with the web page. As will be described in further detail below, the logged information may later be correlated with information logged by web server agent 302 and NIC agent 312 to provide a complete picture of interactions between client browsers 330A-C, NIC 254, and web server 300.

Browser agents 332, web server agent 302 and NIC agent 312 may each further be operable to communicate the collected statistics to a collector server 310, which may in turn be operable to correlate and display the received statistics, as will be described in further detail below. In one embodiment, collector server 310 may be a computer system 200 of the type described above, and may be connected to various other components by interconnect 340. Alternatively, in another embodiment, collector server 310 may be part of performance monitoring system 100 and may be operable to communicate with other components as part of the performance monitoring system.

It is noted that in various embodiments, the number of client systems 320, client browsers 330, web servers 300, NICs 254, web server agents 302, NIC agents 312, and browser agents 332 may vary according to the implementation of the performance monitoring system 100.

Figure 4:
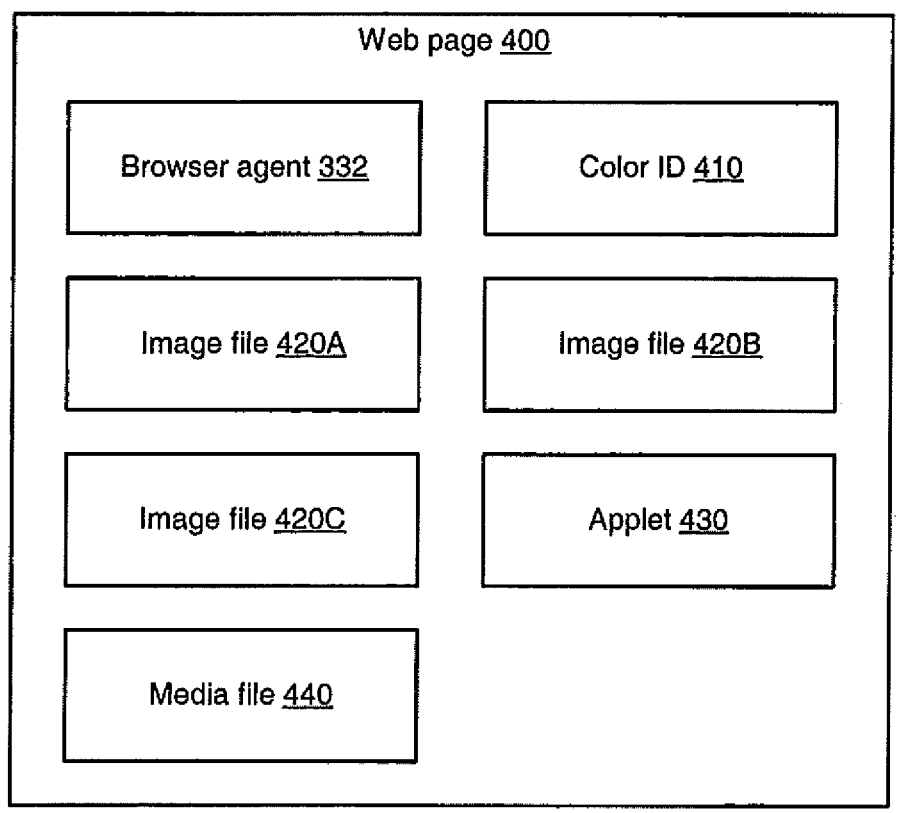
FIG. 4 is a block diagram of an exemplary web page.

Turning now to FIG. 4, a block diagram of an exemplary web page 400 is shown. In one embodiment, web page 400 may be a static HTML file, while in another embodiment, web page 400 may be a dynamically assembled HTML file created in response to a database query. Web page 400 may include a plurality of embedded files, such as image files 420A-C, applet 430, and media file 440. In various embodiments, image files 420A-C may be JPEG files, GIF files, bitmap files, or any other type of image file. Applet 430 may be any type of lightweight program, such as Java™, Javascript™, or Microsoft .NET™. Media file 440 may be an audio clip, a video clip, or an embedded animation in a language such as Flash™. It is also noted that web page 400 may contain additional types of files, may contain any number of the file types described above, or may contain no embedded files of any specific type.

Web page 400 may also contain a browser agent 332. In one embodiment, browser agent 332 may be embedded in every web page 400 sent out by web server 300, while in another embodiment each web page 400 sent out by web server 300 may contain scripting code operable to retrieve a browser agent 332 from a specified location and install the browser agent 332 on the client browser 330 receiving the web page 400. In a further embodiment, the scripting code in web page 400 may only retrieve a browser agent 332 if no browser agent 332 is currently installed on the client browser 330 receiving the web page. In yet another embodiment, browser agent 332 may already be statically installed on a web browser 330, and may not be part of web page 400.

As described in further detail above, web server 300 may further be operable to color a web page 400 with a color ID 410. As will be described in further detail below, color ID 410 may be operable to uniquely identify a specific web page 400 and associated components sent from web server 300 to client browser 330. In one embodiment, color ID 410 may be a Java™ cookie, while in another embodiment color ID 410 may be an alphanumeric string embedded in the web page as a comment, or as part of an embedded script.

Figure 5:
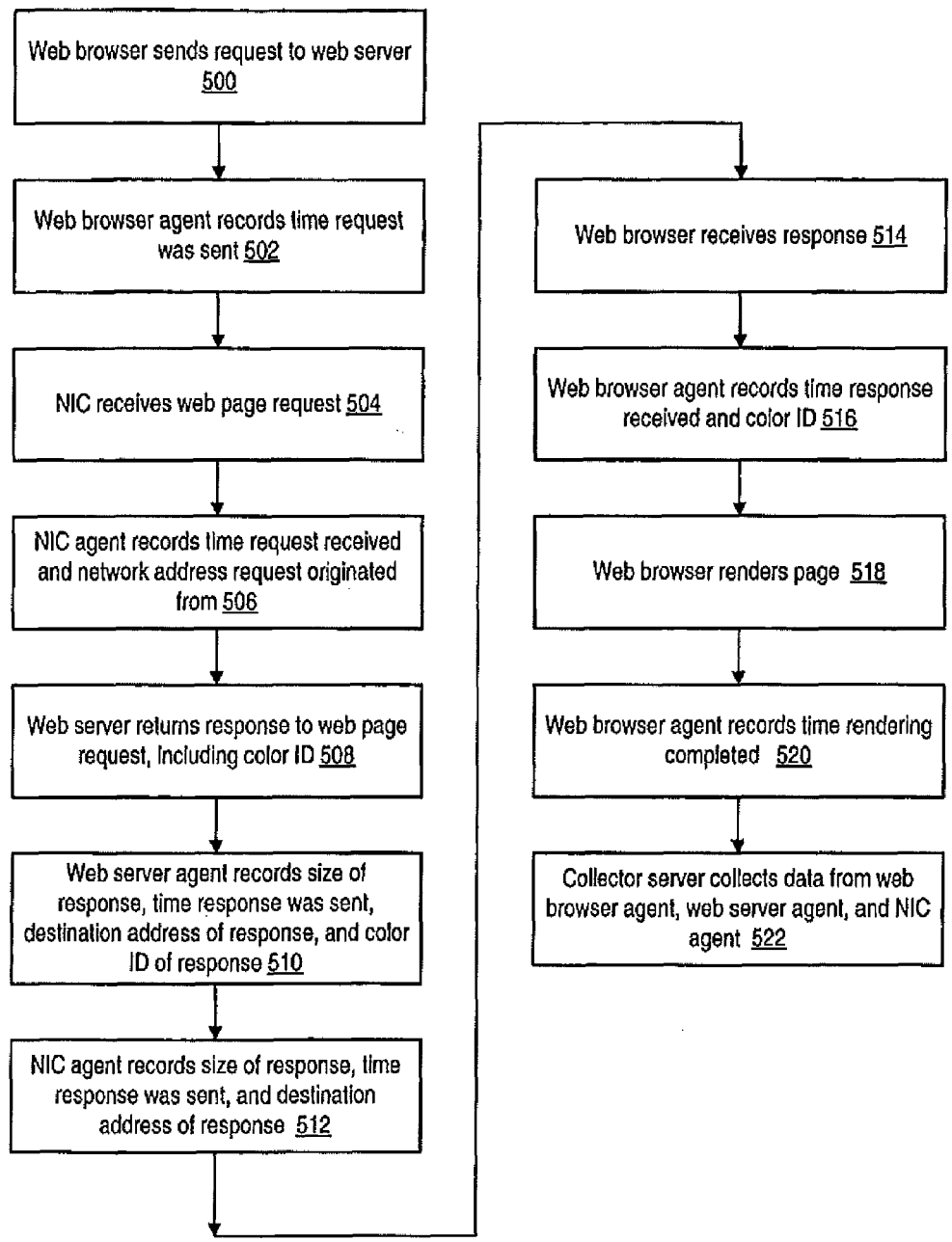
FIG. 5 is a flowchart illustrating one embodiment of a method for collecting transaction data.

Turning now to FIG. 5, a flow chart of one embodiment of a method for collecting web transaction data is shown. In step 500, client browser 330 sends a request for a web page 400 to web server 300. In step 502, an associated browser agent 332 logs the time the request was sent to the web server 330. As will be described in further detail below, in one embodiment browser agent 332 may maintain one or more data structures per web page request which may later be used to collect and correlate information related to the web page request.

In step 504, a NIC 254 receives the request from client system 320, and in step 506, NEC agent 312 logs the time the request was received and the network address the request was received from. In step 508 the web server 300 returns a response to client browser 330 through NIC 254. As described above, in one embodiment web server 300 may include a color ID 410 in web page 400. In step 510 the web server agent 302 may log what time the web server 300 sent the response to the client browser 330, as well as the data transfer size of the response, the network address the response is being sent to, and the color ID associated with each web page response.

In step 512, NIC agent 312 logs the time each response is sent through NIC 254, the data transfer size of each response, and the destination address of each response. In step 514, the client browser 330 receives the response, and in step 516, the browser agent 332 logs the time the first byte of the response was received, as well as the color ID associated with the response. In one embodiment, the browser agent 332 may use the color ID associated with the web page as an index for all past and future data associated with the web page request process. For example, browser agent 332 may place the color ID of the received web page 400 and the time the web page was received in the same data structure as the time the original request for web page 400 was sent. In one embodiment browser agent 332 may then clear the color ID from the received web page.

In step 518, the client browser 330 renders the received web page 400. It is noted to that in one embodiment rendering the received web page may comprise sending additional requests for components of web page 400 stored on web server 300. In turn, NIC 254 and web server 300 may receive the additional requests and return corresponding responses, while NIC agent 312 and web server agent 302 log the information associated with each additional request and response, as described above in steps 506, 510 and 512.

For example, the web page 400 received by client browser 330 may contain a reference to media file 440. Accordingly, client browser 330, as part of the rendering process, may send an additional request to web server 300 for media file 440, which may in turn result in NIC agent 312 logging the time the request for media file 440 was received by NIC 254, as well as the network address of the client browser 330 sending the request. Web server 300 may service the request by returning media file 440, while web server agent 302 and NIC agent 312 may both log the time the file was returned, the address it was returned to, and the data transfer size of the file. In various embodiments, any number of request/response cycles for web page components may occur during the web page rendering process.

In step 520 the browser agent 332 may log at what time the web page rendering process of client browser 330 completes, thereby completing the collection of information on the various events associated with a web page transaction. In step 522, collector server 320 may retrieve the collected information from browser agent 332, web server agent 302, and NIC agent 312. In one embodiment collector server 320 may also collect the network addresses of the web browser 330 and the web server 300 so that the collected data may be correlated as described below.

Figure 6:
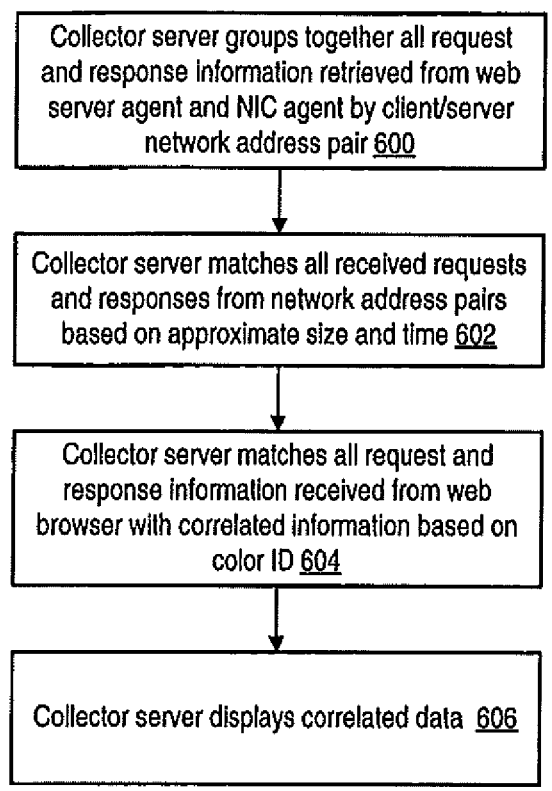
FIG. 6 is a flowchart illustrating one embodiment of a method for correlating transaction data.

Turning now to FIG. 6, a flow chart of one embodiment of a method for correlating web transaction data is shown. In step 600 collector server 320 correlates all data retrieved from NIC agent 312 and web server agent 302 by matching all communication events between a web server 300 network address and a client browser 330 network address. For example, in one embodiment collector server 320 may place all communication events between a specific client/server IP address pair on a virtual timeline, thereby providing a complete picture of the time each response or request was received and sent.

In step 602, the collector server 302 further matches information logged by NIC agent 312 and web server agent 302 by time and data transfer size. In one embodiment, the collector server 302 may match time and data transfer size within certain predetermined tolerances. For example, as described above, collector server 320 may place all communication events between a specific client/server IP address pair on a virtual timeline. Collector server 320 may then match information on the timeline logged by NIC agent 312 with information on the timeline logged by web server agent 302 if the logged times each event was sent at are approximately equal, and if the logged data transfer size of each event is approximately equal. More specifically, in one instance web server agent may log sending a 21 kilobyte response at 13:05:43.158, while NEC agent 312 may log sending a 23 kilobyte response at 13:05:43.253. Accordingly, taking into account a certain amount of latency between the web server and the NIC, and a certain increase in data transfer size due to added error correction code, collector server 320 may match the logged information from the web server agent and the NIC agent as different perspectives on the same event.

It is noted that by repeating this process for all information paired by client/server network address, collector server 320 may be able to correlate all logged information from NIC 254 and web server 300 on one or more web page transactions. It is also noted that the tolerances of the time and size comparisons described above may differ according to various embodiments. For example, in one embodiment the expected latency between a response being sent by a web server 300 and the response being sent through a NIC 254 may be tens of milliseconds.

In step 604 collector server 320 matches all correlated data from the web server agent 302 with the data from browser agent 332 according to the color ID 410 of each web page 400. For example, as described above, in one embodiment web server 300 may be operable to send a web page 400 to a client browser 330 with a color ID 410 in the form of a Java cookie. Web server agent 302 may be operable to log the color ID associated with the web page 400, while browser agent 332 may be operable to log that a web page 400 with a given color ID 410 was received at a given time, and that the web page 400 subsequently completed rendering at another time. Accordingly, by matching the color ID 410 values logged by web server agent 302 and browser agent 332, collector server 320 may be operable to match all logged information regarding web page 400.

In step 606, collector server 320 displays information on one or more web page transactions in various formats. For example, in one embodiment, collector server 320 may be operable to piece together information on a complete chain of events regarding a specific web page transaction, including, but not limited to, the time at which client browser 330 requested the web page, the time at which NIC 254 received the request, the time at which web server 300 returned the requested web page 400, the time at which the web page 400 was sent through NIC 254, the time at which client browser 330 received the web page 400, and the time at which client browser 330 completed rendering the web page.

Figure 7:
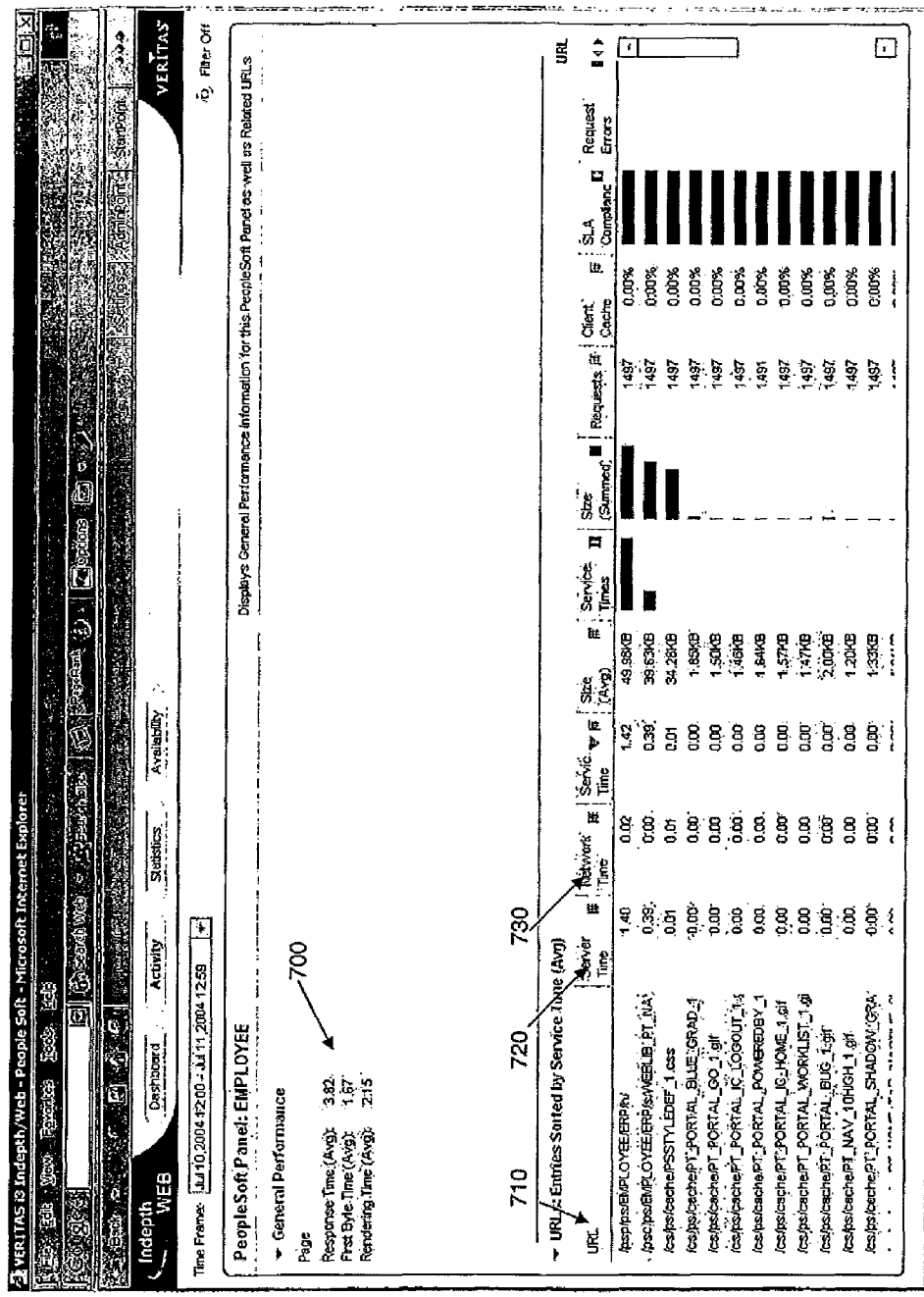
FIG. 7 is an exemplary diagram of one embodiment of a display of correlated transaction data.

Furthermore, collector server 320 may be operable to correlate end-to-end data from multiple web servers 300, NICs 254, and client browsers 330 to provide a detailed representation of all web page transactions monitored by performance monitoring system 100. For example, FIG. 7 illustrates an exemplary display of collected transaction data. In one embodiment, a panel 700 lists average response times for a specific web page, including the average time taken for the first byte of data to be received by a client browser 330 in response to a request, the average time taken by a client browser 330 to complete the web page rendering process after the first byte has been received, and the total time taken for a web page to be received and completely rendered. Field 710 shows each of the web page's sub-component URLs that contribute to the average times shown in panel 700. Accordingly, field 720 shows the time taken by one or more servers 300 to retrieve a corresponding URL, while field 730 shows the time taken by one or more NICs 254 to transmit the corresponding URL. Other fields associated with specific web pages and their sub component (URL) may also show various performance metrics.

It is noted that the above representation of web transaction activity may be utilized to isolate problematic components, improve efficiency and customer response time, and better allocate network resources. For example, in one embodiment a system administrator may determine that all web page requests serviced by a given web server 300 take an abnormally long time to return from the web server. Accordingly, the system administrator may determine that the web server 300 should be serviced or replaced. Furthermore, the system administrator may be able to determine what web pages were affected by the slow web server, and in turn determine which business units may be affected by a slowdown in the servicing of those web pages.

In another example, a web designer may determine that an abnormally high percentage of web page views are abandoned by customers in a specific before the page finishes rendering. Accordingly the web designer may redesign the web page to be more quickly rendered or more attractive for customers in the country in question.

In still another example a system administrator may be able to explore the overall operation of one or more web servers 300 by looking at aggregate performance statistics and "drilling down" to view end-to-end performance information on a specific web page transaction, thereby allowing the administrator to achieve a "hands-on" feel for the to performance of a web transaction. It is also noted that the fields described above are purely exemplary, and that in various embodiments other data may be correlated and displayed in various different ways.

It is further noted that the method described above may be implemented, in various embodiments, as a lightweight mechanism operable to monitor every web page transaction carried out by one or more web servers 300. Furthermore, the method described above may be operable to monitor the performance of a plurality of client browsers 330 on a variety of platforms and operating systems, and to provide a complete, real-world representation of the end user client browser experience.

It is further noted that any of the embodiments described above may further include receiving, sending or storing instructions and/or data that implement the operations described above in conjunction with FIGS. 1-7 upon a computer readable medium. Generally speaking, a computer readable medium may include storage media or memory media such as magnetic or optical media, e.g. disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
logging information on network interface card (NIC) events involving a web page transaction, said steps of logging information on NIC events including maintaining said information on NIC events in one or more data structures after said NIC events:
logging information on web server events involving the web page transaction;
logging information on client browser events involving the web page transaction;
collecting the information on NIC events, the information on web server events, and the information on client browser events on a collector server; and
correlating the information on NIC events, the information on web server events, and the information on client browser events to monitor performance of the web page transaction;
wherein correlating the information comprises correlating the information on client browser events with the information on web server events by a color ID, said color ID being sufficient to uniquely identify a specific web page and its associated components.

2. The method of claim 1, wherein correlating the information comprises correlating the information on NIC events with the information on web server events by matching pairs of NIC events and web events by time and data transfer size.

3. The method of claim 1,
wherein logging information on NIC events comprises utilizing a NIC agent configured to recognize messages which are part of selected web page transaction,
wherein logging information on web server events comprises utilizing a web server agent, and
wherein logging information on client browser events comprises utilizing a browser agent.

4. The method of claim 1, including steps of, at the client device, logging whether the web page was abandoned before the web page completed rendering.

5. The method of claim 1, including steps displaying information on the overall operation of one or more web servers.

6. The method of claim 1 wherein correlating the information comprises correlating the information on NIC events with the information on web server events by grouping events by a client address and a server address.

7. A system comprising:
a performance monitoring system operable to:
log event information from a client browser operable to request a web page as part of a web page transaction,
log information from a web server operable to return the web page as part of the web page transaction, and
log information from a network interface card (NIC) operable to convey the web page as part of the web page transaction, including maintained logged information from said NIC in one or more data structures after said information has left said NIC; and
a collector server operable to monitor performance of the web page transaction by:
collecting the event information from the client browser, from the web server, and from the NIC; and
correlating the event information from the client browser, from the web server, and from the NIC;

wherein the collector server is able to correlate the event information from the client browser with the event information from the web server events by a color ID, said color ID being sufficient to uniquely identify a specific web page and its associated components.

8. The system of claim 7, wherein the collector server is able to correlate the event information from the NIC with the event information from the web server by matching pairs of NIC events and web events by time and data transfer size.

9. The system of claim 7, wherein the performance monitoring system comprises:
   a NIC agent operable to log event information from the client browser, said NIC agent configured to recognize messages which are part of selected web page transactions,
   a web server agent operable to log event information from the web server, and
   a browser agent operable to log event information from the client browser.

10. The method of claim 7, wherein an agent at the client device is further operable to log whether the web page was abandoned before the web page completed rendering.

11. The method of claim 7, wherein the collector server is further operable to display information on the overall operation of one or more web servers.

12. The system of claim 7, wherein the collector server is able to correlate the event information from the NIC with the event information from the web server by grouping events by a client address and a server address.

13. A non-transitory computer readable medium including program instructions executed to implement a method comprising:

logging information on network interface card (NIC) events involving a web page transaction, including maintaining said information on NIC events in one or more data structures after said NIC events;
logging information on web server events involving the web page transaction;
logging information on client browser events involving the web page transaction; and
collecting the information on NIC events, the information on web server events, and the information on client browser events on a collector server; and
correlating the information on NIC events, the information on web server events, and the information on client browser events to monitor performance of the web page transaction;
wherein correlating the information comprises correlating the information with the information on web server events by a color ID, said color ID being sufficient to uniquely identify a specific web page and its associated components.

14. The non-transitory computer readable medium of claim 13, wherein correlating the information comprises correlating the information on NIC events with the information on web server events by matching pairs of NIC events and web events by time and data transfer size.

15. The non-transitory computer readable medium of claim 13, wherein correlating the information comprises correlating the information on NIC events with the information on web server events by grouping events by a client address and a server address.

\* \* \* \* \*